United States Patent
Sullivan et al.

(10) Patent No.: US 7,125,345 B2
(45) Date of Patent: *Oct. 24, 2006

(54) LOW DEFORMATION GOLF BALL

(75) Inventors: Michael J. Sullivan, Barrington, RI (US); Michael D. Jordan, East Greenwich, RI (US); Derek A. Ladd, Fairhaven, MA (US)

(73) Assignee: Acushnet Company, Fairhaven, MA (US)

(*) Notice: Subject to any disclaimer, the term of this patent is extended or adjusted under 35 U.S.C. 154(b) by 81 days.

This patent is subject to a terminal disclaimer.

(21) Appl. No.: 10/279,506

(22) Filed: Oct. 24, 2002

(65) Prior Publication Data

US 2004/0082407 A1    Apr. 29, 2004

(51) Int. Cl.
*A63B 37/06* (2006.01)
(52) U.S. Cl. .................................. 473/374
(58) Field of Classification Search ............... 473/377, 473/378, 373, 374, 370
See application file for complete search history.

(56) References Cited

U.S. PATENT DOCUMENTS

| | | | |
|---|---|---|---|
| 4,650,193 A | 3/1987 | Molitor et al. ............ 273/228 |
| 5,273,286 A | 12/1993 | Sun ............................ 273/228 |
| 5,306,760 A | 4/1994 | Sullivan .................... 524/400 |
| 5,482,285 A | 1/1996 | Yabuki et al. |
| 5,688,191 A | 11/1997 | Cavallaro et al. .......... 473/373 |
| 5,733,206 A | 3/1998 | Nesbitt et al. ............. 473/377 |
| 5,743,816 A | 4/1998 | Ohsumi et al. ............ 473/376 |
| 5,772,531 A | 6/1998 | Ohsumi et al. ............ 473/376 |
| 5,776,012 A | 7/1998 | Moriyama et al. |
| 5,783,293 A | 7/1998 | Lammi ....................... 428/212 |
| 5,803,831 A | 9/1998 | Sullivan et al. ............ 473/374 |
| 5,810,678 A | 9/1998 | Cavallaro et al. ........... 473/373 |
| 5,816,937 A | 10/1998 | Shimosaka et al. ......... 473/354 |
| 5,885,172 A | 3/1999 | Hebert et al. .............. 473/354 |
| 5,902,855 A | 5/1999 | Sullivan .................... 525/221 |
| 5,947,842 A | 9/1999 | Cavallaro et al. ........... 473/373 |
| 5,952,415 A | 9/1999 | Hwang ....................... 524/399 |
| 5,965,669 A | 10/1999 | Cavallaro et al. ........... 525/221 |
| 6,056,842 A | 5/2000 | Dalton et al. .............. 156/243 |
| 6,068,561 A | 5/2000 | Renard et al. ............. 473/364 |
| 6,071,201 A | 6/2000 | Maruko |
| 6,083,119 A | 7/2000 | Sullivan et al. ............ 473/354 |
| 6,113,831 A | 9/2000 | Nesbitt et al. ............. 264/250 |
| 6,117,025 A | 9/2000 | Sullivan .................... 473/373 |
| 6,132,324 A | 10/2000 | Hebert et al. .............. 473/378 |
| 6,152,834 A | 11/2000 | Sullivan .................... 473/365 |
| 6,162,135 A | 12/2000 | Bulpett et al. ............. 473/373 |
| 6,180,040 B1 | 1/2001 | Ladd et al. ................. 264/248 |
| 6,210,293 B1 | 4/2001 | Sullivan .................... 473/374 |
| 6,213,895 B1 | 4/2001 | Sullivan et al. |
| 6,254,495 B1 | 7/2001 | Nakamura et al. |
| 6,284,840 B1 | 9/2001 | Rajagopalan et al. ........ 525/92 |
| 6,291,592 B1 * | 9/2001 | Bulpett et al. ............. 525/248 |
| 6,299,550 B1 | 10/2001 | Molitor et al. ............. 473/354 |

(Continued)

FOREIGN PATENT DOCUMENTS

WO    WO 00/23519    4/2000

(Continued)

*Primary Examiner*—Raeann Gorden
(74) *Attorney, Agent, or Firm*—Mandi B. Milbank

(57) ABSTRACT

A golf ball comprising an innermost core, an outer core, and a cover is disclosed. At least a layer of the golf ball is made from a low compression, high coefficient of restitution material, and is being supported by a low deformation, high compression layer. The resulting golf ball has high coefficient of restitution at high and low impact speeds and low compression for controlled greenside play.

7 Claims, 2 Drawing Sheets

U.S. PATENT DOCUMENTS

| | | |
|---|---|---|
| 6,309,314 B1 | 10/2001 | Sullivan et al. .............. 473/378 |
| 6,315,680 B1 | 11/2001 | Dalton et al. ................ 473/373 |
| 6,339,119 B1 | 1/2002 | Ladd et al. .................. 524/336 |
| 6,350,793 B1 | 2/2002 | Kennedy et al. |
| 6,355,715 B1 | 3/2002 | Ladd et al. .................. 524/432 |
| 6,431,998 B1 | 8/2002 | Nakamura et al. |
| 6,537,158 B1 | 3/2003 | Watanabe |
| 6,583,229 B1 | 6/2003 | Mano et al. |
| 6,605,009 B1 | 8/2003 | Nakamura et al. |
| 6,616,549 B1 | 9/2003 | Dalton et al. |
| 6,635,716 B1 | 10/2003 | Voorheis et al. |
| 6,656,059 B1 * | 12/2003 | Umezawa et al. ........... 473/373 |
| 6,702,694 B1 * | 3/2004 | Watanabe .................... 473/371 |
| 6,783,468 B1 * | 8/2004 | Sullivan et al. .............. 473/374 |
| 6,837,805 B1 | 1/2005 | Binnette et al. |
| 2001/0009310 A1 | 7/2001 | Hebert et al. ................ 264/129 |
| 2002/0010035 A1 | 1/2002 | Nesbitt et al. ............... 473/371 |
| 2002/0019268 A1 | 2/2002 | Tsunoda et al. ............. 473/351 |

FOREIGN PATENT DOCUMENTS

| | | |
|---|---|---|
| WO | WO 01/29129 A1 | 4/2001 |

* cited by examiner

LOW DEFORMATION GOLF BALL

FIELD OF THE INVENTION

This invention generally relates to golf balls with high coefficient of restitution and low deformation, and more particularly to a high coefficient of restitution golf ball at high club speeds.

BACKGROUND OF THE INVENTION

Golf balls have been designed to provide particular playing characteristics. These characteristics generally include initial ball velocity, coefficient of restitution (CoR), compression, weight distribution and spin of the golf ball, which can be optimized for various types of players.

Golf balls can generally be divided into two classes: solid and wound. Solid golf balls include single-layer, dual-layer (i.e., solid core and a cover), and multi-layer (i.e., solid core of one or more layers and/or a cover of one or more layers) golf balls. Wound golf balls typically include a solid, hollow, or fluid-filled center, surrounded by tensioned elastomeric thread, and a cover.

Generally, the hardness of a golf ball or a golf ball core is one among other factors used in designing golf balls. Typically, when a ball is hard, e.g., possessing high compression values and low deformation when struck by a club, it typically has high CoR and high initial velocity after impact with a golf club. However, hard ball has a "hard" feel and is difficult to control on the greens. A softer ball, e.g., lower compression value and high deformation, has a "soft" feel and is easier to control with short iron clubs for greenside play. Recently developed solid balls have a core, at least one intermediate layer, and a cover. The intermediate layer improves other playing characteristics of solid balls, and can be made from thermoset or thermoplastic materials.

Recent advancements in golf ball design can produce golf balls with low compression for soft "feel" and high CoR for long flight distance. The CoR for low compression balls, however, decreases at higher impact speed with golf clubs.

Hence, there remains a need in the art for low compression golf balls that have high coefficient of restitution at low impact speeds and at high impact speeds.

SUMMARY OF THE INVENTION

Hence, the present invention is directed to a golf ball that has high coefficient of restitution at all impact speeds.

The present invention is also directed to a golf ball that has high coefficient of restitution at high and low impact speeds while maintaining soft feel and control characteristics.

The present invention strikes a balance between a soft core, which provides a soft feel to the player but suffers from low coefficient of restitution at high club head speeds, and a hard core, which provides a higher coefficient of restitution but suffers from a hard feel to the player.

The present invention is directed to a golf ball comprising an innermost core, a cover and an intermediate layer disposed between the innermost core and the cover, wherein one of either the core or the intermediate layer comprises a rubber composition containing a halogenated organosulfur compound, and wherein the other of either the core or the intermediate layer has a compression of greater than about 60 PGA, and wherein the golf ball has a coefficient of restitution of greater than 0.81 at about 125 feet per second. The rubber composition preferably comprises at least about 2.2 parts per hundred of the halogenated organosulfur compound, and preferably the halogenated organosulfur compound is pentachlorothiophenol or a zinc salt of pentachlorothiophenol.

The compression is preferably greater than about 80 PGA, and more preferably greater than about 90 PGA. The coefficient of restitution of the ball is greater than 0.75 at 160 feet per second, and more preferably greater than 0.76 at 160 feet per second. In accordance to one aspect of the present invention, the intermediate layer is formed from the rubber composition. On the other hand, the core can be formed from the rubber composition.

In accordance to one embodiment, the present invention is directed to a golf ball comprising an innermost core, a cover and an intermediate layer disposed between the innermost core and the cover, wherein the intermediate layer comprises a rubber composition containing a halogenated organosulfur compound, and wherein the core and the intermediate layer have a compression of greater than about 60 PGA. Preferably, the compression is greater than about 80 PGA, and more preferably greater than about 90 PGA. This golf ball has coefficient of restitution of at least about 0.81 at about 125 feet per second, and coefficient of restitution of at least about 0.76 at about 160 feet per second.

The intermediate layer has a hardness of about 25 to about 70 on the Shore C scale. Preferably, the intermediate layer has a hardness of less than about 60 on the Shore C scale. On the other hand, the core has a hardness of at least about 70 on the Shore C scale, and the compression of the core is greater than about 70 PGA, and preferably greater than about 80 PGA.

The thickness of the intermediate layer is about 0.001 inch to about 0.100 inch, preferably about 0.010 inch to about 0.050 inch, and more preferably about 0.015 inch to about 0.035 inch. The diameter of the innermost core and the intermediate layer is at least about 1.500 inches.

In accordance with another embodiment, the present invention is directed to a golf ball comprising an innermost core, a cover and an intermediate layer disposed between the innermost core and the cover, wherein the core comprises a rubber composition containing a halogenated organosulfur compound, and wherein the core and the intermediate layer have a compression of greater than about 60 PGA. Preferably, the compression is greater than about 80 PGA, and more preferably greater than about 90 PGA. This golf ball has coefficient of restitution of at least 0.80 at 125 feet per second, and more preferably at least 0.81 at 125 feet per second.

The rubber composition of the core preferably comprises about 2.2 phr to about 5.0 phr of halogenated organosulfur compound, and the diameter of the core is less than about 1.500 inches. Preferably, the core has a compression of less than about 60 PGA and more preferably less than about 50 PGA. The thickness of the intermediate layer is at least about 0.090 inch, and preferably between about 0.090 inch and about 0.180 inch. The intermediate layer comprises a laminate, and may comprise a blend of a fatty acid salt highly neutralized polymer and a high stiffness partially neutralized ionomer. The intermediate layer has a flexural modulus of greater than about 50,000 psi, and preferably greater than about 60,000 psi. More preferably, the flexural modulus of the intermediate layer is between about 50,000 psi to about 150,000 psi.

In an example of this embodiment, the innermost core has a diameter of from about 0.800 to about 1.400 inches and a compression of less than about 30 PGA, and the intermediate layer has flexural modulus of at least about 50,000 to at least about 70,000 psi and a thickness of about 0.110 inch, and the cover comprises thermoset polymer having a hardness from about 45 to about 60 on the Shore D scale and a thickness from about 0.020 inch to about 0.040 inch.

In accordance to yet another embodiment, the present invention is directed to a golf ball comprising an innermost core and a cover, wherein an inner cover layer of the cover comprises a rubber composition containing a halogenated organosulfur compound, and wherein the core has a compression of greater than about 60 PGA, wherein the golf ball has a coefficient of restitution of at least 0.80 at 125 feet per second. The halogenated organosulfur compound is preferably pentachlorothiophenol, or a zinc salt of pentachlorothiophenol. The cover may further comprise an outer cover layer and an intermediate cover layer disposed between the outer cover layer and the inner cover layer. The cover preferably has a thickness of less than about 0.125 inch. The inner cover layer preferably has a thickness in the range of about 0.005 inch to about 0.100 inch, more preferably about 0.010 inch to about 0.090 inch and most preferably about 0.015 inch to about 0.070 inch. The core has a diameter in the range of at least 1.400 inches, and has compression greater than about 80 PGA and preferably greater than about 90 PGA.

BRIEF DESCRIPTION OF THE DRAWINGS

In the accompanying drawings, which form a part of the specification and are to be read in conjunction therewith and in which like reference numerals are used to indicate like parts in the various views.

DETAILED DESCRIPTION OF THE PREFERRED EMBODIMENTS

Figure 1:
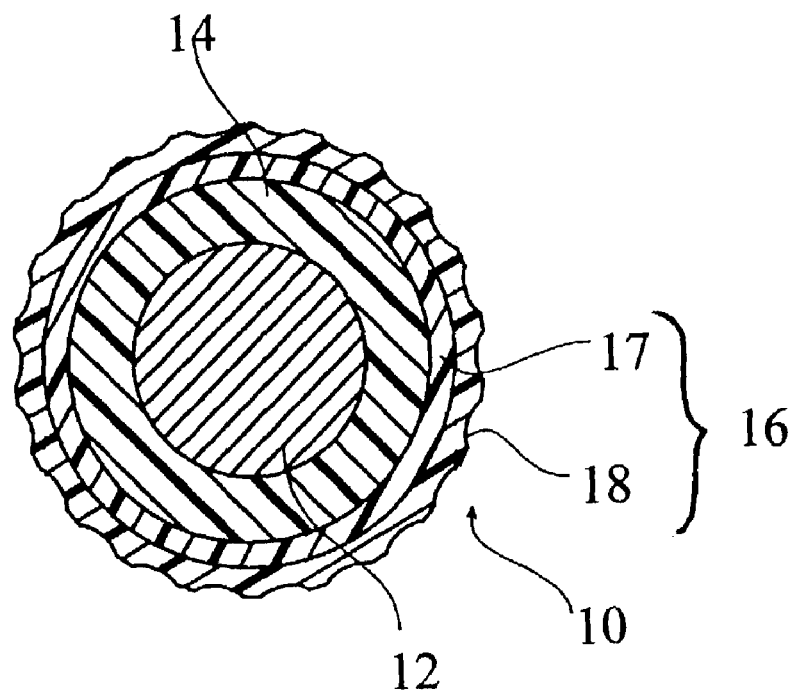
FIG. 1 is a cross-sectional view of a first embodiment of the present invention.
Figure 2:
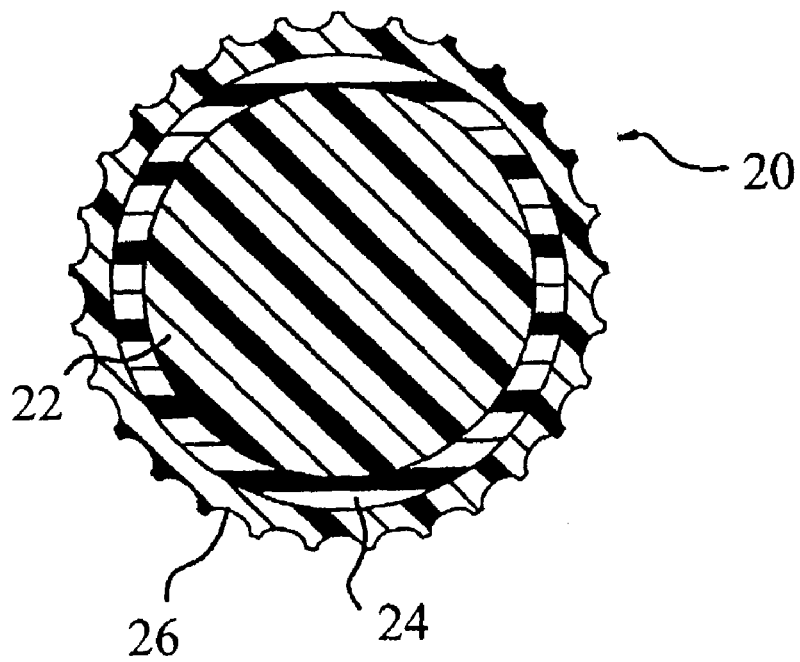
FIG. 2 is a cross-sectional view of a second embodiment of the present invention.
Figure 3:
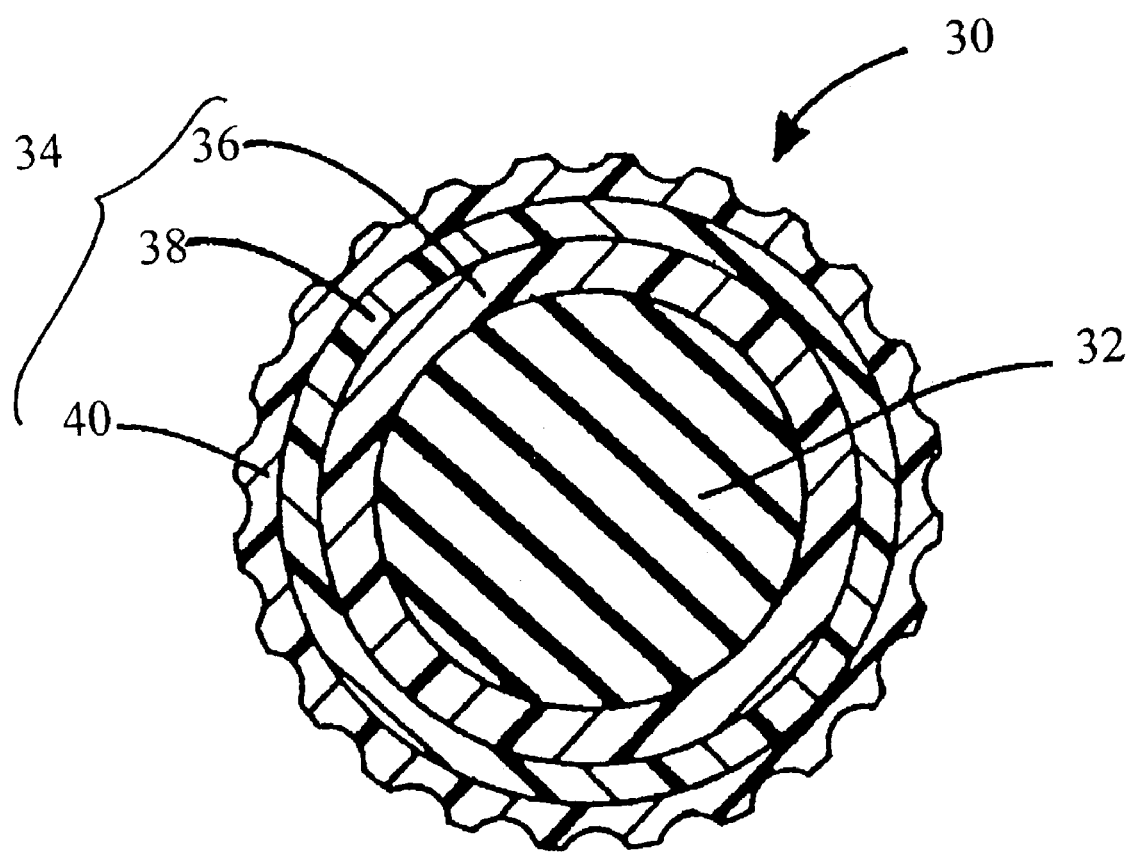
FIG. 3 is a cross-sectional view of a third embodiment of the present invention.

Initial velocity of a golf ball after impact with a golf club is governed by the United States Golf Association ("USGA"). The USGA requires that a regulation golf ball can have an initial velocity of no more than 250 feet per second ±2% or 255 feet per second. The USGA initial velocity limit is related to the ultimate distance that a ball may travel (280 yards ±6%), and is also related to the coefficient of restitution ("CoR"). The coefficient of restitution is the ratio of the relative velocity between two objects after direct impact to the relative velocity before impact. As a result, the CoR can vary from 0 to 1, with 1 being equivalent to a perfectly or completely elastic collision and 0 being equivalent to a perfectly plastic or completely inelastic collision. Since a ball's CoR directly influences the ball's initial velocity after club collision and travel distance, golf ball manufacturers are interested in this characteristic for designing and testing golf balls.

One conventional technique for measuring CoR uses a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec. As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $CoR=T_{out}/T_{in}$.

Another CoR measuring method uses a titanium disk. The titanium disk intending to simulate a golf club is circular, and has a diameter of about 4 inches, and has a mass of about 200 grams. The impact face of the titanium disk may also be flexible and has its own coefficient of restitution, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball's incoming velocity. The ball impacts the titanium disk, and rebounds through the light screens which measure the time period to transit between the light screens. This provides an outgoing transit time period proportional to the ball's outgoing velocity. CoR can be calculated from the ratio of the outgoing time period to the incoming time period along with the mass of the disk and ball:

$$CoR = \frac{(T_{out}/T_{in}) \times (M_e + M_b) + M_b}{M_e}$$

Solid golf balls with soft cores have been utilized to provide balls with good feel for better control. Recently, a soft core has been developed that is also capable of high initial velocity when impacted by a high velocity driver club. Such technology is discussed in commonly owned co-pending patent application entitled "Low Spin Soft Compression Performance Golf Ball", bearing Ser. No. 09/992,448 and filed on Nov. 16, 2001 (the '448 application). The disclosure of the '448 application is incorporated herein by reference in its entirety. An example of such technology is a core formed of polybutadiene rubber with Mooney viscosity of about 40 to about 60. The core preferably also has an organosulfur additive, such as zinc pentachlorothiophenol (ZnPCTP) or pentachlorothiophenol (PCTP), to improve feel and to improve the velocity of the ball after impact at low compression. The compression of such core is less than 60 PGA and more preferably in the range of 20 to 60, and most preferably in the range of 30 to 60.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Compression is measured by applying a spring-loaded force to the golf ball center, golf ball core or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160-Riehle Compression).

Thus, a Riehle compression of 100 would be the same as an Atti compression of 60.

Golf balls made with such cores enjoy high CoR at relatively low club speeds. The CoR of these balls is higher than the CoR of similar balls with higher compression cores at relatively low club speeds. At higher club speeds, however, the CoR of golf balls with low compression cores can be lower than the CoR of balls with higher compression cores. As illustrated herein, a first golf ball with a 1.505 inch core and a core compression of 48 (hereinafter "Sample-48") and a second golf ball with a 1.515 inch core and a core compression of 80 (hereinafter "Sample-80") were subject to the following distance and CoR tests. Sample-48 and Sample-80 have essentially the same size core and similar dual-layer cover. The single most significant difference between these two balls is the compression of the respective cores.

| | | Ball Speed (feet per second) | | | |
|---|---|---|---|---|---|
| | Compression On Ball | Average Driver Set-up | Standard Driver Set-up | Pro 167 Driver Set-up | Big Pro 175 Driver Set-up |
| Sample-48 | 86 | 141.7 | 162.3 | 167.0 | 175.2 |
| Sample-80 | 103 | 141.5 | 162.1 | 168.9 | 176.5 |

| | | Coefficient of Restitution (CoR) | | | |
|---|---|---|---|---|---|
| | Compression on Ball | Mass Plate (125 ft/s) | Mass Plate (160 ft/s) | 200-gram Solid Plate (160 ft/s) | 199.8-gram Calibration Plate (160 ft/s) |
| Sample-48 | 86 | 0.812 | 0.764 | 0.759 | 0.818 |
| Sample-80 | 103 | 0.796 | 0.759 | 0.753 | 0.836 |
| Difference (Sample-48–Sample-80) | | +0.016 | +0.005 | +0.006 | −0.018 |

As used in the ball speed test, the "average driver set-up" refers to a set of launch conditions, i.e., at a club head speed to which a mechanical golf club has been adjusted so as to generate a ball speed of about 140 feet per second. Similarly, the "standard driver set-up" refers to a similar ball speed at launch conditions of about 160 feet per second; the "Pro 167 set-up" refers to a ball speed at launch conditions of about 167 feet per second; and the "Big Pro 175 set-up" refers to a ball speed at launch conditions of about 175 feet per second. Also, as used in the CoR test, the mass plate is a 45-kilogram plate (100 lbs) against which the balls strike at the indicated speed. The 200-gram solid plate is a smaller mass that the balls strike and resembles the mass of a club head. The 199.8-gram calibration plate resembles a driver with a flexible face that has a CoR of 0.830.

The ball speed test results show that while Sample-48 holds a ball speed advantage at club speeds of 140 feet per second to 160 feet per second launch conditions, Sample-80 decidedly has better ball speed at 167 feet per second and 175 feet per second launch conditions.

Similarly, the CoR test results show that at the higher collision speed (160 feet per second), the CoR generally goes down for both balls, but the 199.8-gram calibration test shows that the CoR of the higher compression Sample-80 is significantly better than the lower compression Sample-48 at the collision speed (160 feet per second). Additionally, while the CoR generally goes down for both balls, the rate of decrease is much less for Sample-80 than for Sample-48. Unless specifically noted, CoR values used hereafter are measured by either the mass plate method or the 200-gram solid plate method, i.e., where the impact plate is not flexible. Unless otherwise noted, CoR values used hereafter are measured by either the mass plate method or the 200-gram solid plate method.

Without being limited to any particular theory, the inventors of the present invention believe that at high impact, the ball with lower core compression deforms more than the ball with higher core compression. Such deformation negatively affects the initial velocity and CoR of the ball.

In accordance to the present invention, a golf ball is provided with a low compression and high CoR layer, which is supported or otherwise reinforced by a low deformation layer. Preferably, the low compression, high CoR layer is made from a polymer composition including a halogenated organosulfur compound. Such rubber and halogenated organosulfur composition is fully disclosed in commonly owned and co-pending patent application entitled "Golf Ball Cores Comprising A Halogenated Organosulfur Compound" bearing Ser. No. 09/951,963 and filed on Sep. 13, 2001 (the '963 application). The disclosure of the '963 co-pending patent application is hereby incorporated by reference in its entirety.

The preferred polymeric composition comprises a base rubber compound, a co-reaction agent, a filler, a halogenated organosulfur compound and a co-crosslinking or initiator agent. The base rubber compound typically includes natural or synthetic rubbers. A preferred base rubber is 1,4-polybutadiene having a cis-structure of at least 40%, more preferably at least about 90%, and most preferably at least about 95%. Most preferably, the base rubber comprises high-Mooney-viscosity rubber. Preferably, the base rubber has a Mooney viscosity greater than about 35, more preferably greater than about 50. Preferably, the polybutadiene rubber has a molecular weight greater than about 400,000 and a polydispersity of no greater than about 2. A common indicator of the degree of molecular weight distribution of a polymer is its polydispersity, defined as the ratio of weight average molecular weight, $M_w$, to number average molecular weight, $M_n$. Polydispersity ("dispersity") also provides an indication of the extent to which the polymer chains share the same degree of polymerization. If the polydispersity is 1.0, then all polymer chains must have the same degree of polymerization. Since $M_w$, is always equal to or greater than $M_n$, polydispersity, by definition, is equal to or greater than 1.0. Such rubber compounds are commercially available from Bayer of Akron, Ohio, UBE Industries of Tokyo, Japan, and Shell of Houston, Tex, among others. The base rubber may also be mixed with other elastomers known in the art such as natural rubber, polyisoprene rubber and/or styrene-butadiene rubber in order to modify the properties of the core.

Suitable co-reaction agents include a metal salt of diacrylate, dimethacrylate or monomethacrylate. Preferably, the co-reaction agent is zinc diacrylate (ZDA) and is present in the amount from about 5 to about 40 and more preferably from about 5 to about 30 and most preferably from about 10 to about 20 parts per one-hundred parts of rubber compound (phr). Suitable cross-linking agents include any known polymerization initiator, which decomposes during the cure cycle. Such initiators include, but are not limited to, organic peroxide compounds such as dicumyl peroxide. In its pure form, the preferred amount of peroxide is between about 0.25 phr and about 2.5 phr. Any filler can be used in any desired quantity to alter a property of the core, including specific weight, flexural modulus, moment of inertia, rheological properties, among others. Suitable fillers include, but are not limited to, tungsten, zinc oxide, barium sulfate, silica, metal oxides, ceramic and fibers.

Preferably, polybutadiene rubber composition contains at least about 2.2 parts per hundred of a halogenated organosulfur compound. More particularly, the polybutadiene rubber composition may include between about 2.2 parts and about 5 parts of a halogenated organosulfur compound. The halogenated organosulfur compound may include pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts, the metal salts thereof, and mixtures thereof. Preferably, the preferred halogenated organosulfur is pentachlorothiophenol or a metal salt thereof. The metal salt may be zinc, calcium, potassium, magnesium, sodium, and lithium, but is preferably zinc. Pentachlorothiophenol is commercially available from Strucktol Company of Stow, Ohio, and zinc pentachlorothiophenol is commercially available from eChinachem of San Francisco, Calif.

This preferred polybutadiene rubber composition may further include an α,β-unsaturated carboxylic acid or a metal salt thereof, an organic peroxide, and a filler. Also, as discussed in co-pending '448 patent application, another preferred polybutadiene rubber compound comprising the halogenated organosulfur compound is a mid Mooney viscosity polybutadiene having viscosity in the range of about 40 Mooney to about 60 Mooney.

On the other hand, the low deformation layer in accordance to the present invention may comprise a durable, low deformation material such as metal, rigid plastics, or polymers re-enforced with high strength organic or inorganic fillers or fibers, or blends or composites thereof, as discussed below. Suitable plastics or polymers include, but not limited to, high cis- or trans-polybutadiene, one or more of partially or fully neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, EPR, EPDM, thermoplastic or thermosetting polyurethanes, polyureas, polyurethane ionomers, epoxies, polycarbonates, polybutadiene, polyisoprene, and blends thereof. In the case of metallocenes, the polymer may be cross-linked with a free radical source, such as peroxide, or by high radiation. Suitable polymeric materials also include those listed in U.S. Pat. Nos. 6,187,864, 6,232,400, 6,245,862, 6,290,611, 6,142,887, 5,902,855 and 5,306,760 and in PCT publication nos. WO 01/29129 and WO 00/23519.

Preferably, when the low deformation layer is made with polybutadiene or other synthetic and natural rubber, the rubber composition is highly cross-linked with at least 50 phr of a suitable co-reaction agent, which includes a metal salt of diacrylate, dimethacrylate or mono methacrylate. Preferably, the co-reaction agent is zinc diacrylate. Highly cross-linked rubber compounds are discussed in commonly owned co-pending patent application entitled "Golf Ball and Method for Controlling the Spin Rate of Same" bearing Ser. No. 10/178,580 filed on Jul. 20, 2002. This discussion is incorporated herein by reference.

Another readily apparent advantage of the present invention is that highly rigid materials, such as certain metals, can now be used in a golf ball, because the rigidity of the materials can resist the deformation of the low compression, high CoR layer. Suitable rigid metals include, but not limited to, tungsten, steel, titanium, chromium, nickel, copper, aluminum, zinc, magnesium, lead, tin, iron, molybdenum and alloys thereof.

Suitable highly rigid materials include those listed in columns 11, 12 and 17 of U.S. Pat. No. 6,244,977. Fillers with very high specific gravity such as those disclosed in U.S. Pat. No. 6,287,217 at columns 31–32 can also be incorporated into the inner core 15. Suitable fillers and composites include, but not limited to, carbon including graphite, glass, aramid, polyester, polyethylene, polypropylene, silicon carbide, boron carbide, natural or synthetic silk.

In accordance to a first embodiment of the present invention, golf ball 10 comprises at least two core layers, an innermost core 12 and an outer core 14, and a cover 16. Preferably, outer core 14 comprises a flexible, low compression, high CoR rubber composition discussed above, and inner core 12 comprises a low deformation material discussed above. The hard, low deformation inner core 12 resists deformation at high club speeds to maintain the CoR at an optimal level, while the resilient outer layer 14 provides high CoR at slower club speeds and the requisite softness for high iron club play. The inventive ball 10, therefore, enjoys high initial velocity and high CoR at high and low club head speeds associated, while maintaining a desirable soft feel and soft sound for greenside play.

In accordance to one aspect of the present invention, inner core 12 is made from a rubber composition that is highly cross-linked with more than 50 phr of zinc diacrylate and the outer core 14 comprises rubber composition containing at least 2.2 phr of a halogenated organosulfur compound.

In accordance to one aspect of this first embodiment, inner core 12 comprises a thin, hollow metal shell encased by an outer shell comprising rubber composition containing at least 2.2 phr of a halogenated organosulfur compound.

Other rubber compounds for outer core 14 may also include any low compression, high resilient polymers comprising natural rubbers, including cis-polyisoprene, trans-polyisoprene or balata, synthetic rubbers including 1,2-polybutadiene, cis-polybutadiene, trans-polybutadiene, polychloroprene, poly(norbomene), polyoctenamer and polypentenamer among other diene polymers. Outer core 14 may comprise a plurality of layers, e.g., a laminate, where several thin flexible layers are plied or otherwise adhered together.

Preferably, the rigid inner core 12 has a flexural modulus in the range of about 25,000 psi to about 250,000 psi. More preferably, the flexural modulus of the rigid inner core is in the range of about 75,000 psi to about 225,000 psi, and most preferably in the range of about 80,000 psi to about 200,000 psi. Furthermore, the rigid inner core has durometer hardness in the range of greater than about 70 on the Shore C scale. The compression of the rigid inner core is preferably in the range of greater than about 60 PGA or Atti. More preferably, the compression is greater than about 70, and most preferably greater than about 80. Shore hardness is measured according to ASTM D-2240-00, and flexural modulus is measured in accordance to ASTM D6272-98 about two weeks after the test specimen are prepared.

Preferably, the outer core is softer and has a lower compression than the inner core. Preferably, outer core 14 has a flexural modulus of about 500 psi to about 25,000 psi. More preferably, the flexural modulus is less than about 15,000 psi. The outer core preferably has a hardness of about 25 to about 70 on the Shore C scale. More preferably, the hardness is less than 60 on the Shore C scale.

One preferred way to achieve the difference in hardness between the inner core and the outer core is to make the inner core from un-foamed polymer, and to make the outer core from foamed polymer selected from the suitable materials disclosed herein. Alternatively, the outer core may be made from these suitable materials having their specific gravity reduced. In this embodiment the inner and outer core can be made from the same polymer or polymeric composition.

Preferably, outer core layer 14 has a thickness from about 0.001 inch to about 0.100 inch, preferably from bout 0.010 inch to about 0.050 inch and more preferably from about 0.015 inch to about 0.035 inch. Preferably, the overall core diameter is greater than about 1.50 inch, preferably greater than about 1.580 inch, and more preferably greater than about 1.60 inch. The inner core 12 may have any dimension so long as the overall core diameter has the preferred dimensions listed above.

The cover 16 should be tough, cut-resistant, and selected from conventional materials used as golf ball covers based on the desired performance characteristics. The cover may be comprised of one or more layers. Cover materials such as ionomer resins, blends of ionomer resins, thermoplastic or thermoset urethane, and balata, can be used as known in the art.

The cover 16 is preferably a resilient, non-reduced specific gravity layer. Suitable materials include any material that allows for tailoring of ball compression, coefficient of restitution, spin rate, etc. and are disclosed in U.S. Pat. Nos. 6,419,535, 6,152,834, 5,919,100 and 5,885,172. Ionomers, ionomer blends, thermosetting or thermoplastic polyurethanes, metallocenes are the preferred materials. The cover can be manufactured by a casting method, reaction injection molded, injected or compression molded, sprayed or dipped method.

In a preferred embodiment, cover 16 comprises an inner cover 17 and an outer cover 18. As disclosed in the U.S. Pat. Nos. 5,885,172 and 6,132,324, which are incorporated herein by reference in their entireties, outer cover layer 18 is made from a soft thermoset material, such as cast polyurethane, and inner cover 17 is made from a rigid material to provide ball 10 with progressive performance, i.e., the ball has the low spin and long distance benefits of a hard cover ball when struck with a driver club and high spin and soft feel characteristics of a traditional soft cover ball when struck with short irons.

Inner cover layer 17 is formed preferably from a hard, high flexural modulus, resilient material which contributes to the low spin, distance characteristics of the presently claimed balls when they are struck for long shots (e.g. driver or long irons). Specifically, the inner cover layer materials have a Shore D hardness of about 65–80, preferably about 69–74 and most preferably about 70–72. The flexural modulus of inner cover layer 17 is at least about 65,000 psi, preferably about 70,000 psi to about 120,000 psi and most preferably at least about 75,000 psi. The thickness of the inner cover layer can range from about 0.020 inches to about 0.045 inches, preferably about 0.030 inches to about 0.040 inches and most preferably about 0.035 inches.

Outer cover layer 18 is formed preferably from a relatively soft thermoset material in order to replicate the soft feel and high spin play characteristics of a balata ball for "short game" shots. In particular, the outer cover layer should have Shore D hardness of less than 65 or from about 30 to about 60, preferably 35–50 and most preferably 40–45. Additionally, the materials of the outer cover layer must have a degree of abrasion resistance in order to be suitable for use as a golf ball cover. The outer cover layer of the present invention can comprise any suitable thermoset material, which is formed from a castable reactive liquid material. The preferred materials for the outer cover layer include, but are not limited to, thermoset urethanes and polyurethanes, thermoset urethane ionomers and thermoset urethane epoxies. Examples of suitable polyurethane ionomers are disclosed in U.S. Pat. No 5,692,974 entitled "Golf Ball Covers'" the disclosure of which is hereby incorporated by reference in its entirety in the present application. Thermoset polyurethanes and polyureas are preferred for the outer cover layers of the balls of the present invention.

Golf ball 10 in accordance to the first embodiment achieves the objects of this invention, because the rigid inner core 12 provides the ball with low deformation at high club head speeds to maintain the CoR in the preferred high range at high club head speeds, while the low compression, high CoR outer core 14 provides high CoR and good feel at lower club head speeds.

In accordance to a second embodiment of the present invention, golf ball 20 comprises a low compression, high CoR inner core 22, a relatively robust, low deformation mantle or intermediate layer 24 and a thin soft cover 26. Ball 20 also has low deformation during impacts at high club speeds, such as hollow wood drivers, and still has soft "feel"

and sound at lower club speeds. To achieve this object, the diameter of the inner core 22 is preferably less than 1.50 inches or smaller, but occupies sufficient volume to positively impact the feel, sound and overall compression. The mantle or intermediate layer preferably has a thickness in the range of at least about 0.080 inch, more preferably at least about 0.090 inch and most preferably between about 0.090 inch and 0.180 inch. The desired thickness can be selected in conjunction with the flexural modulus of the material of the mantle and the desired overall compression of the ball and deformation of the ball. Thicker mantle would provide lower deformation and higher compression.

Most preferably, inner core 22 is formed from a rubber composition containing a halogenated organosulfur compound. Such halogenated organosulfur compound is fully disclosed in commonly owned and co-pending '963 and '448 patent applications, which have already incorporated by reference and discussed above. In accordance to one aspect of the second embodiment, the rubber compound preferably is a high cis- or trans-polybutadiene and has a viscosity of about 40 Mooney to about 60 Mooney. The core has a hardness of greater than about 70 on the Shore C scale, and preferably greater than 80 on the Shore C scale. The core also has a compression of less than about 60 PGA, and more preferably less than about 50 PGA. The resulting core exhibits a CoR of at least about 0.790, and most preferably at least 0.800 at 125 feet per second. Other suitable polymers for inner core 22 include a polyethylene copolymer, EPR, EPDM, a metallocene catalyzed polymer or any of the materials discussed above in connection with outer core 14 discussed above, so long as the preferred compression, hardness and CoR are met.

Inner core 22 may be encased by outer core layers comprising the same materials or different compositions than inner core 22. These outer core layers may be laminated together. Each of the laminate layers preferably has a thickness from about 0.001 inch to about 0.100 inch and more preferably from about 0.010 inch to about 0.050 inch.

Preferably, mantle 24 is made from a low deformation polymeric material, such as an ionomer, including low and high acid ionomer, any partially or fully neutralized ionomer or any thermoplastic or thermosetting polymer. Mantle 24 preferably has a flexural modulus of greater than 55,000 psi and more preferably greater than 60,000 psi. Among the preferred materials are hard, high flexural modulus ionomer resins and blends thereof. Additionally, other suitable mantle materials (as well as core and cover materials) are disclosed in U.S. Pat. No. 5,919,100 and international publications WO 00/23519 and WO 01/29129. These disclosures are incorporated by reference herein in their entireties. One particularly suitable material disclosed in WO 01/29129 is a melt processable composition comprising a highly neutralized ethylene copolymer and one or more aliphatic, monofunctional organic acids having fewer than 36 carbon atoms of salts thereof, wherein greater than 90% of all the acid of the ethylene copolymer is neutralized.

These ionomers are obtained by providing a cross metallic bond to polymers of monoolefin with at least one member selected from the group consisting of unsaturated mono-or di-carboxylic acids having 3 to 12 carbon atoms and esters thereof (the polymer contains 1 to 50% by weight of the unsaturated mono- or di-carboxylic acid and/or ester thereof). More particularly, such acid-containing ethylene copolymer ionomer component includes E/X/Y copolymers where E is ethylene, X is a softening comonomer such as acrylate or methacrylate present in 0–50 (preferably 0–25, most preferably 0–20), weight percent of the polymer, and Y is acrylic or methacrylic acid present in 5–35 (preferably at least about 16, more preferably at least about 16–35, most preferably at least about 16–20) weight percent of the polymer, wherein the acid moiety is neutralized 1–90% (preferably at least 40%, most preferably at least about 60%) to form an ionomer by a cation such as lithium*, sodium*, potassium, magnesium*, calcium, barium, lead, tin, zinc* or aluminum (*=preferred), or a combination of such cations. Specific acid-containing ethylene copolymers include ethylene/acrylic acid, ethylene/methacrylic acid, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid containing ethylene copolymers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate copolymers. The most preferred acid-containing ethylene copolymers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate copolymers.

The manner in which the ionomers are made is well known in the art as described in e.g., U.S. Pat. No. 3,262,272. Such ionomer resins are commercially available from DuPont Co. under the tradename SURLYN® and from Exxon under the tradename Iotek®. Some particularly suitable SURLYNS® include SURLYN® 8140 (Na) and SURLYN® 8546 (Li), which have a methacrylic acid content of about 19%.

Other suitable mantle materials include the low deformation materials described above and any hard, high flexural modulus, resilient material that is compatible with the other materials of the golf ball. Examples of other suitable inner cover materials include thermoplastic or thermoset polyurethanes, thermoplastic or thermoset polyetheresters or polyetheramides, thermoplastic or thermoset polyester, a dynamically vulcanized elastomer, a functionalized styrenebutadiene elastomer, a metallocene polymer or blends thereof.

Suitable thermoplastic polyetheresters include materials, which are commercially available from DuPont under the tradename Hytrel®. Suitable thermoplastic polyetheramides include materials, which are available from Elf-Atochem under the tradename Pebax®. Other suitable materials for the inner cover layer include nylon and acrylonitrile-butadiene-styrene copolymer (ABS).

Another suitable material for the mantle layer is a high stiffness, highly neutralized ionomer having a durometer hardness of at least about 55 on the Shore D scale and a flexural modulus of at least 50,000 psi. The flexural modulus ranges from about 50,000 psi to about 150,000 psi. The hardness ranges from about 55 to about 80 Shore D. This ionomer may be blended with a lowly neutralized ionomers having an acid content of 5 to 25%, and may be blended with non-ionomeric polymers or compatilizers (e.g., glycidyl or maleic anhydride), so long as the preferred hardness and flexural modulus are satisfied. Examples of highly neutralized ionomers are disclosed in commonly owned, co-pending patent application entitled "Golf Ball Comprising Highly-Neutralized Acid Polymers" bearing Ser. No. 10/118,719 filed on Apr. 9, 2002. This application is incorporated herein by reference.

In one preferred embodiment, this suitable material is a blend of a fatty acid salt highly neutralized polymer, such as a melt processible composition comprising a highly neutralized ethylene copolymer and one or more aliphatic, mono-functional organic acids having fewer than 36 carbon atoms of salts thereof, wherein greater than 90% of all the acid of the ethylene copolymer is neutralized, and a high stiffness partially neutralized ionomer, such as those commercially available as Surlyn® 8945, 7940, 8140 and 9120, among others. This blend has hardness in the range of about 65 to about 75 on the Shore D scale.

Mantle 24 may also comprise a laminated layer. For example, mantle 24 may comprise a laminate comprising four layers: a polyamide layer having a flexural modulus of about 200,000 psi, a terpolymer ionomer or un-neutralized acid terpolymer having a flexural modulus of about 30,000 psi, a low acid ionomer having a flexural modulus of about 60,000 psi and a high acid ionomer having a flexural modulus of about 70,000 psi. The composite flexural modulus of the four-layer laminate is about 90,000 psi or approximately the average of the flexural modulus of the four layers, assuming that the thickness of each layer is about the same.

Cover 26 is preferably a two-layer cover similar to cover 16 discussed above. Alternatively, cover 26 may be a single-layer cover made from a soft material, such as cast polyurethane, similar to cover 16 discussed above.

In a preferred embodiment, inner core 22 has a diameter of about 0.800 to about 1.400 inches, a compression of about 30 PGA (or a deformation at 130–10 kg of about 5.0 mm) and a CoR of about 0.800. Mantle 24 comprises a high acid ionomer having a flexural modulus of about 70,000 psi or higher and has a thickness of about 0.110 inch. Cover 26 has an outermost layer comprising cast polyurethane having a hardness of about 45 to 60 on the Shore D scale and a thickness of about 0.020 to about 0.040 inch. This golf ball exhibits high CoR at low and high club head speeds, while providing a soft feel for iron and putter play. The compression can be a low as 0 PGA, and the flexural modulus of the mantle can be as low as 50,000 psi.

In accordance to a third embodiment of the present invention, golf ball 30 comprises a high compression, high resilient core 32 and cover 34 comprising at least three cover layers.

Core 32 preferably comprises a single solid layer. Alternatively, core 32 may comprise multiple layers. Preferably, its diameter is at least about 1.400 inches, more preferably more than about 1.430 inches and most preferably more than about 1.450 inches. Core 32 is preferably a high compression core having a compression greater than about 80 PGA, more preferably greater than about 90 PGA and most preferably greater than about 100 PGA. Core 32 has a CoR of at least about 0.790, more preferably at least about 0.800 and most preferably in the range of about 0.820 and 0.900 so as to give ball 30 a CoR of at least 0.800 and more preferably in the range of about 0.820 to about 0.880. Core 32 may be made from any of the low deformation materials discussed above, so long as it has these preferred properties.

Cover 34 preferably has inner cover layer 36, intermediate cover layer 38 and outer cover layer 40.

Inner cover layer 36 is preferably made from a low compression, high CoR material such as rubber compositions comprising at least about 2.2 phr of halogenated organosulfur compound, as disclosed in commonly owned, co-pending '963 patent application or rubber compositions disclosed in commonly owned, co-pending '448 patent application. Preferably, inner cover layer 36 has flexural modulus in the range of about 500 psi to about 25,000 psi, hardness in the range of about 25 to about 80 on the Shore C scale.

In a preferred embodiment, intermediate cover layer 38 and outer cover layer 40 are similar to the inner cover layer 17 and the outer cover layer 18 of cover 16, respectively, for progressive performance. For example, outer cover layer 40 is made from a soft, thermosetting polymer, such as cast polyurethane, and intermediate cover layer 38 is made from a rigid ionomer or similar composition having hardness of at least 55 on the Shore D scale and flexural modulus of at least 55,000 psi.

The total thickness the cover 34 is preferably less than 0.125 inch. Innermost layer 36 preferably is about 0.005 inch to about 0.100 inch thick, more preferably 0.010 inch to about 0.090 inch, and most preferably about 0.015 inch to about 0.070 inch. Intermediate cover layer 38 preferably is about 0.010 inch to about 0.050 inch thick, and outer cover layer 40 preferably is about 0.020 inch to about 0.040 inch thick.

Golf balls 10, 20 and 30 made in accordance to the present invention and disclosed above have a compression of greater than about 60 PGA, more preferably greater than about 80 and even more preferably greater than about 90 PGA. These balls exhibit CoR of at least 0.80 at 125 feet per second and more preferably at least 0.81 at 125 feet per second. These balls also exhibit CoR of at least 0.75 at 160 feet per second and more preferably at least 0.76 at 160 feet per second.

While it is apparent that the illustrative embodiments of the invention disclosed herein fulfill the objectives stated above, it is appreciated that numerous modifications and other embodiments may be devised by those skilled in the art. One such modification is that the outer surface can be flush with the inner surface free ends or it can extend beyond the free ends. Therefore, it will be understood that the appended claims are intended to cover all such modifications and embodiments, which would come within the spirit and scope of the present invention.

We claim:

1. A golf ball comprising:
   an innermost core having a compression of greater than about 60, a flexural modulus of from 75,000 psi to 225,000 psi, and a Shore C hardness of greater than 70;
   a cover;
   and an intermediate layer disposed between the innermost core and the cover, the intermediate layer comprising a rubber composition containing a halogenated organosulfur compound and having a Shore C hardness of from 25 to 70;
   wherein the golf ball has a coefficient of restitution of greater than about 0.81 at about 125 feet per second.

2. The golf ball of claim 1, wherein the rubber composition comprises at least about 2.2 parts per hundred of the halogenated organosulfur compound.

3. The golf ball of claim 2, wherein the halogenated organosulfur compound is pentachlorothiophenol.

4. The golf ball of claim 3, wherein the halogenated organosulfur compound is zinc salt of pentachlorothiophenol.

5. The golf ball of claim 1, wherein the core has a compression of greater than about 80.

6. The golf ball of claim 1, wherein the golf ball has a coefficient of restitution of greater than 0.75 at 160 feet per second.

7. The golf ball of claim 1, wherein the golf ball has a coefficient of restitution of greater than 0.76 at 160 feet per second.

* * * * *